Feb. 20, 1951  C. F. DIETRICH ET AL  2,542,755
APPARATUS FOR OPTICALLY PROJECTING
AND GAUGING PROFILES
Filed Feb. 15, 1949  7 Sheets-Sheet 1
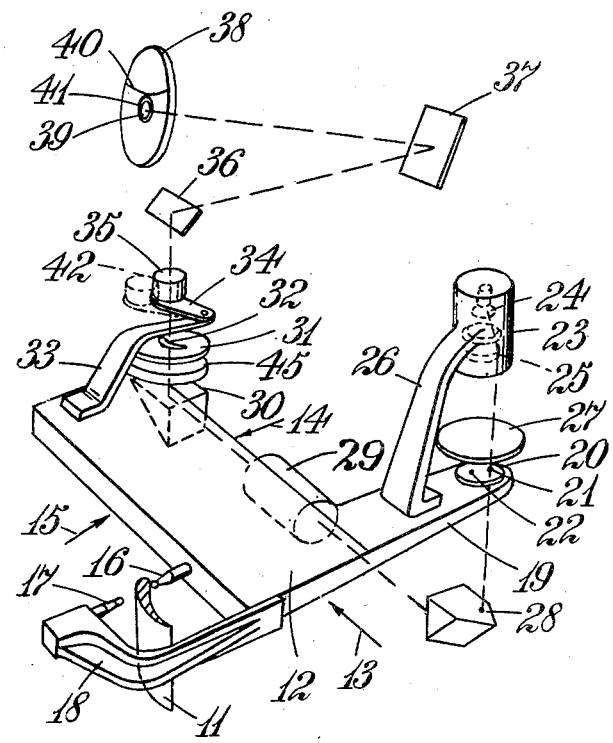
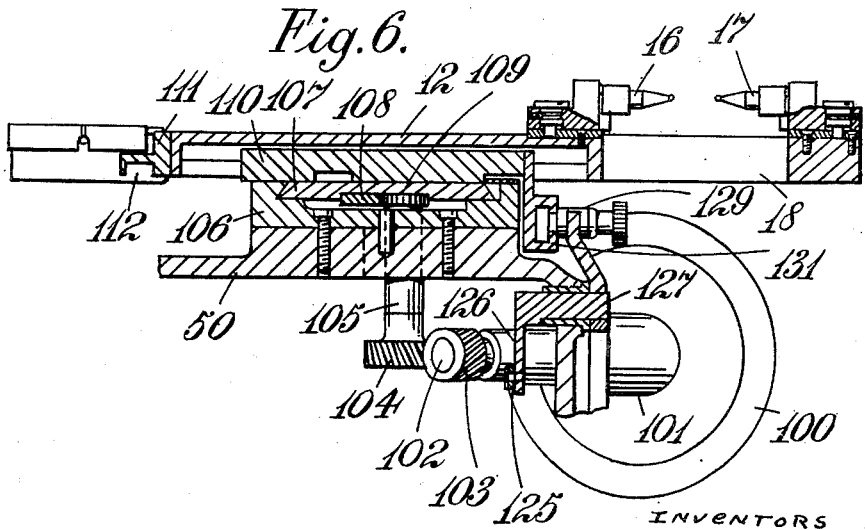
INVENTORS
Cornelius F. Dietrich
& Harry J. Smith
By Watson, Cole, Grindle & Watson

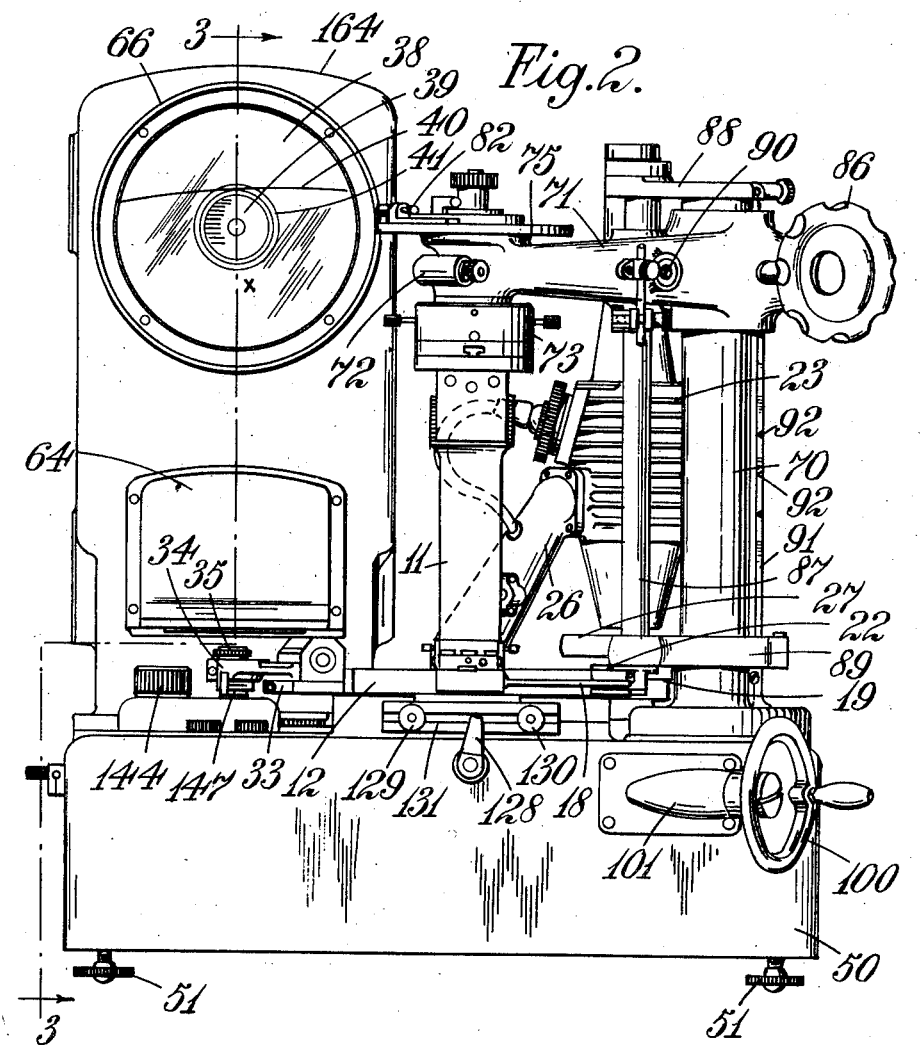

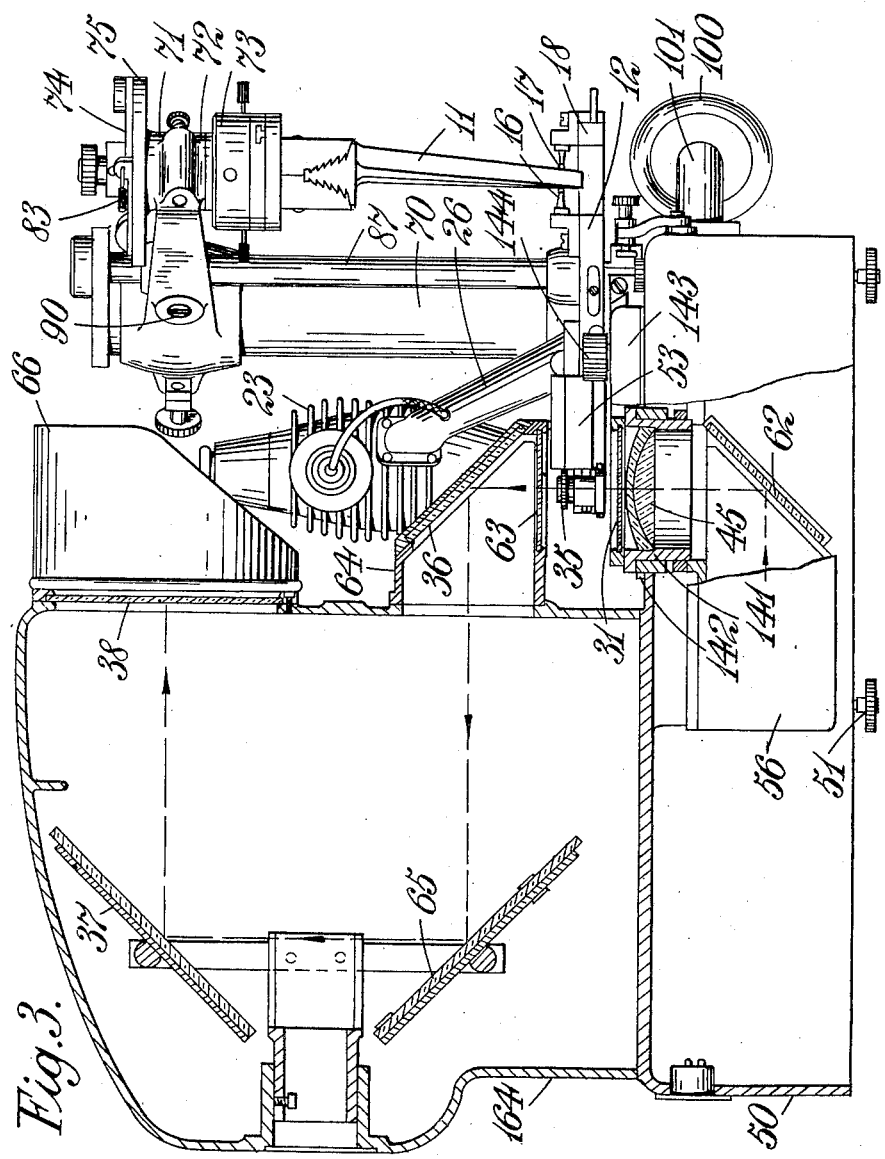

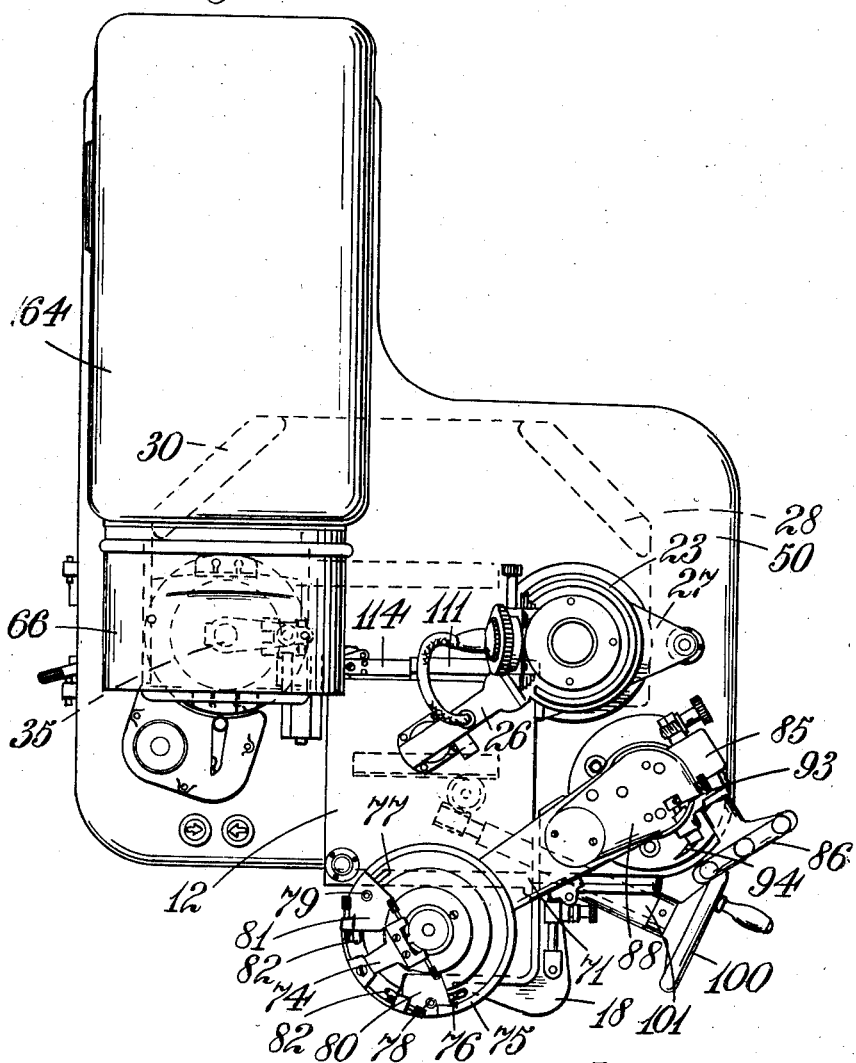

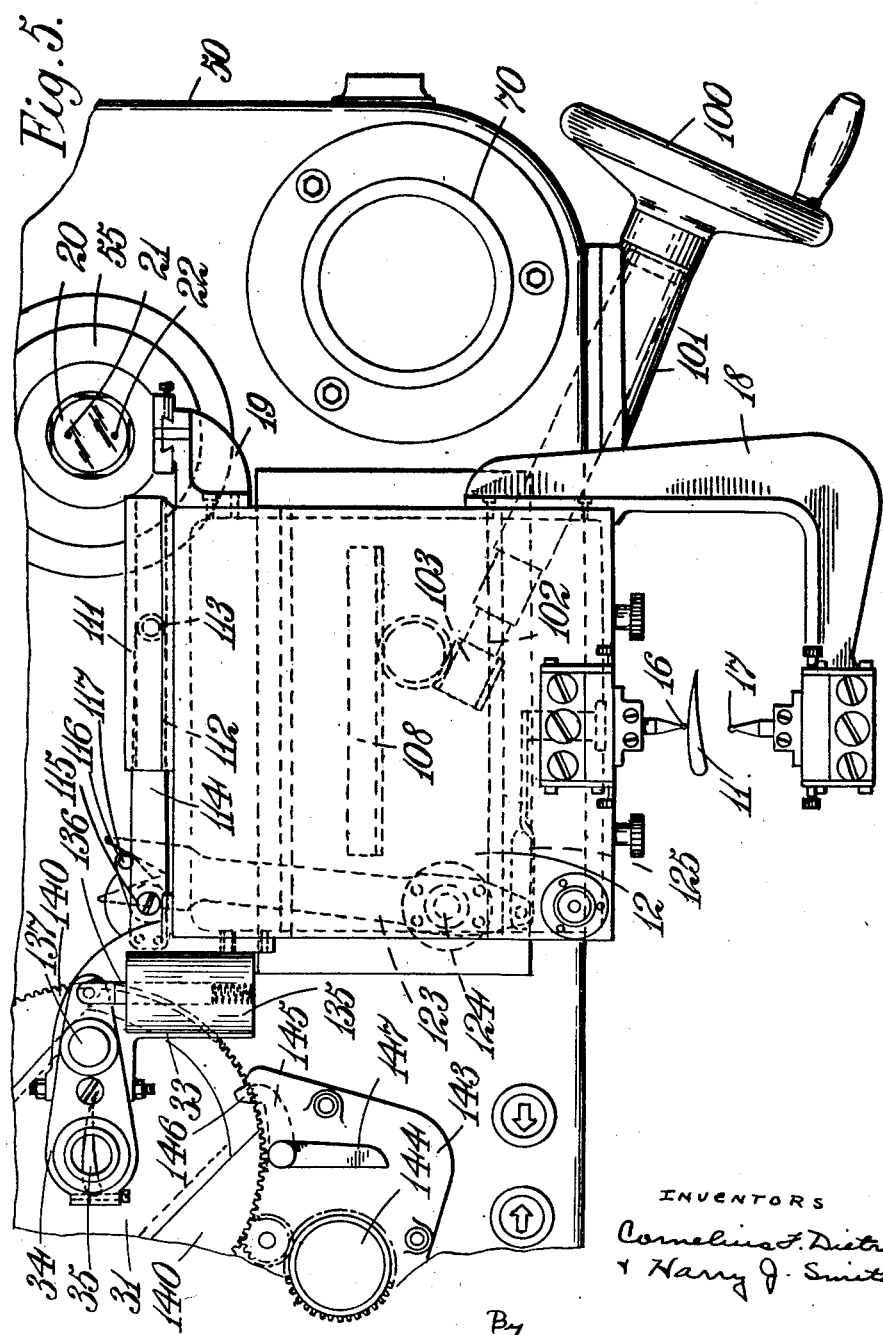

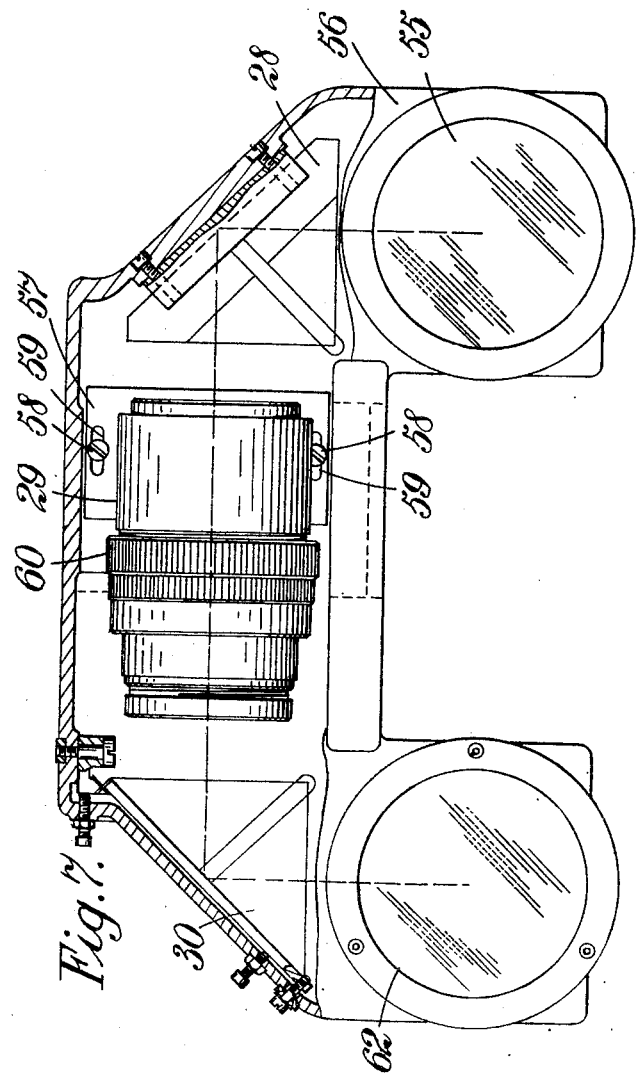

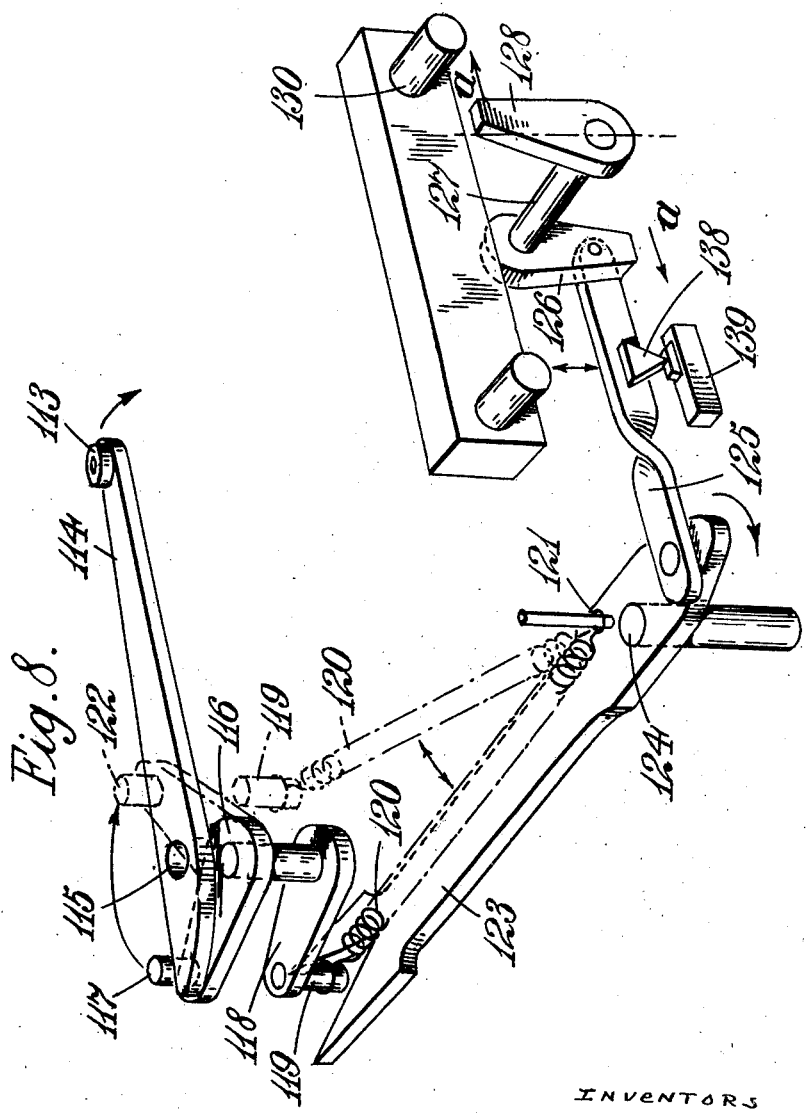

Patented Feb. 20, 1951

2,542,755

UNITED STATES PATENT OFFICE 2,542,755

APPARATUS FOR OPTICALLY PROJECTING AND GAUGING PROFILES

Cornelius Frank Dietrich, Southall, and Harry John Smith, Slough, England, assignors to Optical Measuring Tools Limited, Slough, England, a British company Application February 15, 1949, Serial No. 76,582
In Great Britain February 18, 1948

21 Claims. (Cl. 88—24)

This invention relates to apparatus for gauging by optical means the contour of a profiled workpiece. It has for its object to provide an improved apparatus whereby the contour of a profile may be checked with rapidity and accuracy, especially in cases where the profile cannot be projected in the normal manner. The invention is of particular service for gauging the profiled surfaces of blades used in gas-turbine engines.

This invention relates to apparatus for optically gauging a contour of a workpiece of the type comprising a feeler to engage the workpiece, a movable mounting for this feeler capable of causing it to traverse the surface of the workpiece along the contour to be gauged, a mounting for a spot graticule, or other index, coupled to the feeler so as to copy its movements, an optical projection system for projecting an image of the movements of the index and a mounting for a screen to receive said image, the screen being intended to bear also a representation of a master profile against which the position of the index can be gauged.

In known apparatus of this type, the screen which bears the representation of the master profile is made much larger than the profile which is to be gauged, the master profile being drawn upon it to a suitably enlarged scale and the image of the movements of the index is correspondingly magnified. With this apparatus, working on the larger gas-turbine blades up to 3″ in width and using an optical magnification of 20, there is required a screen size of 60″. This is a somewhat cumbersome size, and the operator must move about in order to view the image.

The main object of the present invention is to provide an improved apparatus which enables the use of large magnifications, of say 30 or more, in conjunction with a small screen, even when the size of the workpiece is large.

According to the present invention, apparatus for optically gauging the contour of a workpiece, of the type described, comprises optical means for projecting an enlarged image from the combined master profile and image of the index, a viewing screen large enough only to receive a part of said image, and means connecting said optical means to the movable mounting for the feeler and thereby causing it to move the image of the master profile sufficiently to keep the image of the index on the viewing screen during traverse of the contour. With such an apparatus the image of the master profile need no longer be drawn to a much enlarged scale. It is preferably represented upon a master graticule which acts as the screen on which the image of the index is focussed and the viewing screen which the operator observes receives a projected image of the master graticule Preferably the means connecting the said optical means to the movable mounting for the feeler is such as to cause the image of the index to remain stationary during traverse of the contour and the means for achieving this result are hereinafter more fully described.

The following is a description by way of example of one construction of apparatus in accordance with the present invention, reference being made to the accompanying drawings in which:

Figure 1 is a perspective diagrammatic view of the principal parts of the apparatus according to the present invention showing the optical system;

Figure 2 is a front elevation of the apparatus;

Figure 3 is a vertical section upon the line 3—3 of Figure 2 looking in the direction of the arrows;

Figure 4 is a plan;

Figure 5 is a plan to an enlarged scale of a portion of the floating table, which carries the feelers for gauging the workpiece, and of its associated parts;

Figure 6 is a vertical section through the table;

Figure 7 is a plan of part of the optical system; and

Figure 8 is a perspective view of the operating parts for the yielding actuation of the feelers.

Referring first to Figure 1, the workpiece to be gauged is shown at 11 and in the example shown is constituted by a turbine blade. This is held in an upright position in a suitable holder, as hereinafter described. Along one side of the blade 11 there is mounted a carriage 12 which is floating, that is to say it can be moved longitudinally by the operator in the direction of the arrow 13 or returned and it is also capable of being yieldingly urged toward the workpiece 11 in the direction of the arrow 14, or, if desired, urged in the opposite direction as indicated by the arrow 15. Movement of the carriage in the direction of the arrow 13 and return is effected manually by a rack and pinion gear hereinafter described. Movement in the direction of the arrows 14 or 15 is spring urged. The carriage supports a pair of opposed feelers or styli 16, 17 for engaging the workpiece 11, the stylus 16 being mounted directly upon the carriage and the stylus 17 being carried from the carriage by an arm 18 which presents the stylus 17 toward the back of the workpiece. If the carriage is spring urged in the direction of the arrow 14 the stylus 16 engages the workpiece and under these conditions, if the carriage is caused to travel in the direction of the arrow 13 or the reverse, the stylus 16 will follow the contour of the blade 11 and the carriage will copy the movement. If the carriage is spring urged in the direction of the arrow 15, the stylus 17 will similarly follow the contour of the back of the blade.

A bracket 19 on the carriage 12 supports a graticule 20 having two spaced circular spots 21, 22. Preferably each spot is surrounded with a concentric ring. These two graticule spots are spaced apart, centre to centre, by a distance equal to the distance between the centres of the tips of the styli 16, 17. It will be observed that the styli have spherical tips and the spots are made of the same diameter as the tips. A lantern 23 is provided, containing a lamp 24 and condenser 25 which is mounted on a bracket 26 secured to the bracket 19 and therefore moving with the table. The lantern 23 directs light downwardly through the graticule 20. A large collecting lens 27 is provided between the lantern and the graticule 20 to collect as much light as possible and to concentrate it upon the graticule. Below the graticule 20 is a "roof" prism 28 which turns the path of the light through a right-angle and also reverses it left for right before it passes into a fixed projection lens system 29 which directs the light through a further prism 30 and field lens 45 on to a master graticule 31. The graticule 31 is stationary and when the stylus 16 is in contact with the blade 11 the image of the spot 21 of the graticule 20 will be focussed on to the graticule 31 and will trace out an image of the profile upon the master graticule. The master graticule 31 carries a representation of a master profile 32 and the master graticule must be so mounted that it can be adjusted to bring the master profile 32 into correspondence with the position of the blade 11 so that if the blade were perfect in its shape the spot 21 would be focussed upon the edge of the master profile 32 throughout the whole of its movement.

After the stylus 16 has been caused to traverse the blade 11 in this way, the spring controlling the table 12 is thrown over to cause the stylus 17 to bear upon the blade and then this also is caused to traverse the contour of the blade and thus the whole periphery is traced out against the master profile on the graticule 31. The image traced out on the graticule 31 is not substantially larger than the blade 11 and is too small to be directly viewed by the operator for gauging purposes. However the table 12 supports a bracket 33 on which is hingedly mounted an arm 34 carrying a projection lens 35 above the graticule 31. The lens 35 picks up a part of the image on the graticule 31, including the image of the spot 21, and projects it by way of mirrors 36, 37 on to a viewing screen 38 where the spot appears in much enlarged form at 39 and a portion 40 of the master profile 32 also appears. The ring surrounding the spot is also focussed on to the screen 38 as indicated at 41 and this ring is placed at such a distance from the spot 39 that as long as the master profile 40 remains within the ring 41 this shows that the blade 11 does not depart from a true shape by more than a permitted tolerance. The magnification on the screen 38 may conveniently be as much as 30, or if desired even more, times the size of the original profile.

When the stylus 17 is in engagement with the workpiece 11, the spot 22 is focussed upon the screen 38 and in order to bring the projection lens 35 above the image of the spot 22 on the graticule 31 it is necessary to swing the arm 34 relative to the bracket 33 into a position which corresponds with that indicated in chain lines in Figure 1 at 42.

It will be seen that the projection lens 35, being mounted on the bracket 33, moves with the table 12 and the spot on the graticule 20 (spot 21 or 22 whichever is in use) also moves with the table 12 so that the projection lens 35 will automatically remain above the image of the spot throughout the movements of the table and the spot is therefore always upon the screen 38. If the lens 29 produces an image which is equal in size to the image of the spot, there will, however, be a movement of the image of the spot over the screen 38 equal to the movement of the table and it is preferable that the image of the spot should not move about even to this extent but should remain at rest. Of course the image 40 of the master contour 32 will in any case move very considerably over the screen 38 as the projection lens 35 traverses with the table the path of the image of the spot 21 (or 22) which corresponds with the shape of the workpiece 11.

To attain a stationary image of the spot at 39, the following considerations apply: Let the magnification produced by the lens between the mirrors be $M_1$, then a movement $Y$ of the spot graticule 20 is reproduced as a movement $M_1Y$ in the plane of the stationary graticule 31. The contour drawn on the stationary graticule is then $M_1$ times larger than the contour of the workpiece being tested. As the projection lens moves with the spot graticule, the movement of the spot relatively to the axis of the projection lens for a movement $Y$ of the stylus is $(M_1-1)Y$. If $M_2$ is the magnification in the projection lens, the movement of the spot relative to the axis of the projection lens in the plane of the screen 38 is $M_2(M_1-1)Y$. Thus the movement of the spot on the projection screen is equal to $$M_2(M_1-1)Y-Y$$

since $Y$ is the movement of the axis of the projection lens, each $M$ being positive: i. e. Movement $X$ of spot $=Y(M_2M_1-M_2-1)$ $$X=Y[M_2(M_1-1)-1]$$

or $$M_2=\frac{1}{M_1-1}$$

If or $$M_1=\frac{M_2+1}{M_2}=1+\frac{1}{M_2}$$

then $X=0$ and the spot appears stationary. If $M_1$ is smaller than this value, the spot will move, and if $M_1$ is greater it will move in the opposite direction. This means that the spot may be rendered stationary or it may be made to move so that it traces out a reproduction of the movement of the stylus to any desired magnification.

The master graticule 31 may bear identification marks such as short lines crossing the master curve, placed at intervals around the contour, preferably with identification numbers, so as to facilitate the identification of the part of the blade being viewed.

The apparatus shown is Figures 2 to 8 embodies the ports shown in Figure 1 in a practical form and where the parts in Figures 2 to 8 correspond with those shown in Figure 1 they are numbered with the same reference numerals. The general disposition of the parts can best be seen by a comparison of Figures 2, 3 and 4 in which it can be seen that the apparatus comprises a hollow metal base 50 supported on levelling screws 51 and carrying guides for a table 12. On the table is secured an upstanding bracket 26 which carries the lantern 23 and at the rear edge of the table is the bracket 33 on which is pivoted the arm 34 carrying the projection lens 35 and also the bracket 19 carrying the graticule 22. It will be observed that the graticule 22 overlies a window 55 in the top of the base 50 and comparison with Figure 7, which shows the prism-assembly located in the base, will show that the window 55 overlies a box structure 56 which contains an inclined mirror for directing the light on to the "roof"-prism 28. The lens assembly 29 is secured to a base-plate 57 by screws 58 working in slots 59 so that the lens assembly can be moved longitudinally for focussing purposes. It can also be focussed more finely by rotation of a screwed portion of the lens mounting 60. Beyond the lens mounting is the second prism 30 which directs the light on to an inclined mirror 62 (Figure 3) below the field lens 45. The mounting of the field lens 45 and the master graticule 31 is hereinafter more fully described. Above the graticule in Figure 3 can be seen the projection lens 35 above which is a window 63 in the underside of a box 64 which contains the mirror 36. The box 64 overlies the projection lens 35 and projects laterally from an upstanding hood 164. The hood 164 supports an inclined mirror 65 which directs the light on to the inclined mirror 37 and thence the light passes to the screen 38 fixed in the front of the hood. In front of the screen 38 there is an extension 66 of the hood, which serves to shield the screen 38 from strong light and to make the image of the spot and the graticule marking easier to observe.

In one corner of the base 50 there is an upstanding column 70 and on the column there slides a blade-supporting bracket 71. The blade-supporting bracket has a head 72 in which works the spindle of a chuck 73 which carries the blade 11, the contour of which is to be gauged. The spindle of the chuck 73 extends upwardly through the head 72 and carries above the head an index arm 74 which overlies a stationary disc 75 above the head 72. The disc 75 is marked with a scale of degrees around its circumference and the index arm 74 has an index mark on its end to co-operate with the scale of degrees. This facilitates setting the blade 11 at a desired angle. The disc 75, moreover, has arcuate slots 76, 77 in which work fixing screws 78, 79 for stop-blocks 80, 81. The stop-blocks contain tangential stop-screws 82, 83 and the index arm 74 can be moved to the left or right until it engages one or other of the stop-screws. Thus a blade which is mounted in the chuck 73 can be set so that at the middle of its height the blade is nearly parallel to the table 12 when the index arm 74 is opposite the zero mark on the degree scale 75 and then if the height of the blade is altered so as to bring the tip portion (the bottom end) opposite to the feelers 16, 17 on the table and the index arm 74 is swung against one of the stop-screws, the blade will be parallel at the tip portion with the table, while if the level of the blade is altered to bring the root portion between the feelers 16, 17 the index arm is swung over against the other stop-screw and the root portion will thereby be brought into parallelism with the table. Of course the term "parallelism" is employed in a rough and ready sense; the section of the blade being curved it cannot lie exactly parallel with the table but the main extension of its length can be brought to lie so that the edges are about equidistant from the table. This reduces the movement of the table when the profile is being gauged and makes for greater accuracy.

It is important that the arm 71 should be adjustable vertically upon the column 70 to permit various points along the blade 11 to be brought between the feelers. To this end the arm 71, where it embraces the column 70, is provided with a hollow lug 85 which contains a pinion to mesh with a rack extending down the back of the column 70. The rack cannot be seen in the drawing, Figure 2 or Figure 3, because it lies toward the rear of the column as viewed in these figures. The pinion in the lug 85 is operated by a hand wheel 86.

To keep the arm 71 in the same vertical plane throughout its up and down movement on the column 70, a guide rod 87 is provided which is carried on bracket arms 88 at the top and 89 at the bottom of the column. The guide rod 87 is carefully adjusted to be exactly parallel with the column 70 and it passes through the bracket arm 71, which engages it by means of contact screws 90, one at the front and one at the rear of the bracket arm, one being visible in Figure 2 and the other in Figure 3 of the drawings.

If a series of blades are being tested which are all intended to be exactly alike, it will be realised that it is important that they should all be gauged at a series of positions along their length which correspond exactly for each workpiece tested. In order to ensure this, the column 70 has a lateral groove into which can be inserted from above a notched gauge-bar 91. The gauge-bar 91 has a number of notches 92 in its length and the hub of the bracket 71, where it embraces the column 70, is provided with a spring pawl 93 to engage the notches. The hand wheel 86 is operated to lower the bracket 71 until the spring pawl 93 drops into one of the notches, whereupon the operator knows that the blade 11 is at one of the heights at which a test is to be taken. When the test has been taken the operator releases the pawl 93 by pulling on a trigger 94 (Figure 4) and the bracket 71 when the blade 11 which it carries can then be lowered to the next notch, another reading taken and the operation repeated until readings have been taken at the levels corresponding to all the notches.

The table 12 must be traversed by hand in the direction corresponding to the arrow 13 of Figure 1 and in the return direction. To this end there is provided a hand wheel 100 which operates on a spindle 102 in an inclined bearing 101, as best seen in Figure 5. The spindle 102 carries at its inner end, which lies beneath the table 12, a skew gear 103 which meshes with another skew gear 104 on a vertical spindle passing through a bearing 105 in the base 50 (see Figure 6 of the drawing). Secured on the base 50 is a guideway 106 for a table-carrying slide 107 and the table-carrying slide 107 carries a rack 108 with which meshes a pinion 109 on the upper end of the spindle of the skew gear 104. Thus rotation of the hand wheel will move the slide 107 in one direction or the other, as may be desired by the operator. Upon the table-carrying slide 107 is a transverse guide member 110 and the table 12 is mounted on the guide member 110 to move at right angles to the direction of the slide 107. The details of this cross sliding mechanism are not shown in the drawing as they do not go beyond ordinary engineering practice, but it should be explained that in order to make the motion easy the carriage 12 slides on balls located in the guideways between the guide 110 and the guideways in the underside of the carriage 12.

The carriage has an inverted channel shaped groove 112 in a pressure member 111 which is secured to its rear edge. In the groove 112 there works a roller 113 (Figure 5) fixed on the end of a carriage-operating lever 114. The carriage-operating lever is spring-urged to move the carriage 12 either in a direction in which it presses the feeler 16 against the blade 11 (arrow 14, Figure 1) or it can be spring urged in the opposite direction to carry the feeler 17 against the blade 11 (arrow 15, Figure 1). This spring control of the lever 114 will now be described. Upon an axis in line with a pivot 115 of the lever 114 there is disposed in the top of the box-shaped base 50 a pivot of a lever 116 which carries at its end an upstanding pin 117. The pivot of the lever 116 passes through the top of the box and is connected below the top, that is to say inside the box formed by the base, to a second lever 118 which carries a pin 119 to which is attached a spring 120 anchored at 121 to the interior of the top of the box. All these parts can be seen in Figure 8 of the drawing. When the parts are in the position shown in Figure 8 the pin 117 bears on the lever 114 at the left hand side of the pivot 115, as shown in the drawing, and the effect of the spring 120 is to cause the lever 114 to move rearwardly and by reason of the engagement of the roller 113 with the groove 112 in the roller guide 111 fixed to the back of the table 12, this urges the table rearwardly and brings the feeler 17 into engagement with the blade 11. Should the lever 116 be thrown over, however, so that the pin 117 engages the back of the lever 114 at the position indicated in chain line at 122 in Figure 8, the roller 113 urges the carriage 12 in the opposite direction and the feeler 16 is brought into engagement. This will be done if the lever 118 is thrown over, carrying the lever 116 with it, and the spring 120 passes the axis of the lever 118 and therefore tends to pull it round in the opposite direction.

It would be possible for the operator to throw over the pin 117 in the manner described but it is much more convenient if the operation can be effected automatically. To this end there is a forked lever 123 pivoted at 124 to the underside of the top of the box 50. The lever is shown in dotted lines in Figure 5 and in full lines in Figure 8. The fork of the lever lies in such a position that it can be brought into engagement with the lower part of the pin 119 on the lever 118 and will push it over to one side or the other of its centre according to the position of the lever. The lever is connected by a link 125 with a downwardly depending lever arm 126 on a spindle 127 passing through the front of the base, the parts being shown in Figure 8 and the position of them easily identified from Figures 5 and 6 of the drawing. In front of the base the spindle 127 carries an upstanding lever arm 128 which is also seen in Figure 2 of the drawing. The arm 128 lies between two adjustable dogs 129, 130 on a slotted member 131 secured to the front of the member 110 which carries the guides for the carriage 12. Therefore as the carriage is moved along by the hand wheel 100, if the dogs 129, 130 are properly set, just as the feeler 16 reaches the end of its traverse the dog 130 will engage the lever 128 and cause the lever 123 to throw over the lever 118 and reverse the pressure of the pin 117 on the back of the lever 114. The result will be that the carriage will be urged in the opposite direction, the feeler 117 will be brought into engagement with the opposite side of the blade 11 which is being gauged and when the return movement of the carriage is completed the dog 129 will engage the lever 128 and trip the parts again into the position where the feeler 16 engages the workpiece, in readiness for the next operation of the apparatus.

It will be appreciated that at the same time that the pressure of the feelers against the workpiece is reversed, the position of the arm 34 which carries the projection lens 35 ought to be thrown over from the full line position of Figure 1 to the chain line position. In order to effect this automatically a solenoid 135 is provided on the bracket 33 which has a core 136 connected to the arm 34 at a position beyond its pivot 137. The link 125 is provided with a cam 138 (Figure 8) to operate a micro-switch 139 in the circuit of the solenoid. When the parts are moving in one direction the solenoid is energised and holds the projection lens 35 in one position, while when the parts are moving in the other direction the cam 138 releases the micro-switch 139, the solenoid is de-energised and the projection lens 35 is pushed over to the other position by a spring (not shown) located within the solenoid 135.

It will be understood that it would be very inconvenient to have to change the graticule 31 every time that the height of the blade 11 is altered to gauge a different contour. The graticule 31 is slid into place above the lens mounting 45 between lateral guide cheeks 140 (Figure 5) and it is convenient to engrave on the same graticule three different cross-sections of the blade 11 corresponding to three different test heights. In order to avoid the lines interfering with one another, the three sections are engraved at successive positions which are shifted around the axis of the graticule by 120° and the mounting 141 of the lens and graticule is made rotatable so that any one of the outlines can be positioned at the correct angle relative to the index spot of the graticule 20 as may be desired. In order to be able to rotate the mounting 141 by an exact amount of 120° readily, the periphery of the mounting is provided with gear teeth 142 which mesh with a pinion in a casing 143, the pinion being operated by a knob 144. The rotatable mounting is positioned by a pawl 145 which drops into any one of three notches 146 cut in the periphery of the mounting. The pawl 145 is urged toward the notch by a spring, not shown, and when the mounting is to be rotated the pawl is withdrawn by pressing on a thumb lever 147.

We claim:

1. Apparatus for optically gauging a contour of a workpiece comprising means for holding a workpiece, a feeler, a movable mounting therefor capable of causing the feeler to traverse the surface of the workpiece along the contour to be gauged, a mounting for an index coupled to the feeler so as to copy its movements, a stationary mounting for a master graticule bearing a representation of the desired contour for the workpiece, an optical system for directing an image of the index on to the master graticule (the optical system being such as to cause the image of the index to trace over the master graticule a path representing the shape of the actual workpiece contour to the same scale as the representation of the desired contour thereon) and optical means for projecting a combined image of the index and a portion of the master graticule on to a screen on an enlarged scale, the said means for projecting the combined image being connected to the movable mounting for the feeler and thereby caused to move the image of the master graticule sufficiently to keep the image of the index on the screen throughout the traverse of the contour.

2. Apparatus as claimed in claim 1 wherein the feeler, the index and a projection lens for projecting the combined image are mounted on a table which is capable of movement in any direction parallel to itself in one plane.

3. Apparatus as claimed in claim 2 wherein the table is provided with means for traversing it in one direction relatively to the surface of the workpiece and means for yieldingly urging it in a transverse direction such as to urge the feeler into contact with the workpiece.

4. Apparatus as claimed in claim 3 wherein two opposed feelers are mounted on the table with space to receive the workpiece between them and the means for yieldingly urging the table in a transverse direction are reversible, so as to urge one or other of the two feelers into contact with the workpiece.

5. Apparatus as claimed in claim 4 wherein two indexes are provided on the table, spaced apart by substantially the same distance as the two feelers and the optical means for projecting the combined image of the index and master graticule is laterally movable to centre it over the image of either index at will.

6. Apparatus as claimed in claim 5 wherein means for reversing the transverse urge on the table is provided in combination with contact means on a member moving with the longitudinal traverse of the table for automatically reversing the said urge after a predetermined longitudinal table movement.

7. Apparatus as claimed in claim 6 wherein the optical projecting means is connected to the automatic reversing means so as to be automatically moved laterally when the means are reversed.

8. Apparatus as claimed in claim 7 wherein the means for moving the optical projecting means laterally comprises a solenoid and electrical connections therefrom to a switch operated by the said automatic reversing means.

9. Apparatus as claimed in claim 1 wherein the index is a spot marked on an index-graticule surrounded by a tolerance circle.

10. Apparatus as claimed in claim 1 wherein there are provided two feelers spaced apart to receive the workpiece between them and two indexes in the form of spots marked upon an index graticule and spaced to correspond with the spacing of the feelers.

11. Apparatus as claimed in claim 1 wherein the means for holding the workpiece comprises a bracket, a slide upon which the bracket is movable, which slide extends in a direction parallel with the length of the workpiece and transverse to the direction of traversing movement of the feeler, and means to move the bracket along the slide to position the workpiece relatively to the feeler at various positions for gauging corresponding contours.

12. Apparatus as claimed in claim 11 wherein a positioning bar, carrying abutments, is held parallel with the slide and the bracket is provided with a cooperating abutment member to engage one or other of the abutments on the slide and so determine a series of positions for the workpiece.

13. Apparatus as claimed in claim 12 wherein a work-holding chuck is mounted upon the bracket so as to be capable of turning about an axis extending parallel to the slide.

14. Apparatus as claimed in claim 13 wherein the work-holding chuck is provided with indexing means to enable the angle to which it is turned to be readily set.

15. Apparatus as claimed in claim 14 wherein the indexing means comprise an index arm and adjustable stops on each side of said arm to limit its angular movement.

16. Apparatus as claimed in claim 1 wherein the master graticule is mounted so as to be rotatable in its own plane and the graticule carries representations of a plurality of contours, angularly displaced in relation to each other, and means are provided for rotating the graticule to bring any one of the representations at will into proper angular relationship with the workpiece.

17. Apparatus as claimed in claim 16, wherein the graticule is slidable laterally relatively to its mounting and wherein the mounting is provided with an indexing device to facilitate angular setting thereof.

18. Apparatus as claimed in claim 17 wherein the indexing device comprises a plurality of abutments in the periphery of the mounting and a pawl to engage any one of the abutments and position the mounting accordingly.

19. Apparatus as claimed in claim 1 wherein the optical means for focussing an image of the index upon the master graticule includes a reversing prism.

20. Apparatus for optically gauging a contour of a work-piece comprising a feeler, a work-piece holder, means for effecting relative movement of the feeler and work-piece holder to traverse the feeler over a profile of a work-piece held in the holder, a master profile, a screen, optical projector for projecting an enlarged image of a part of the master profile upon the screen, means for moving the master profile and projector relatively to one another, an operative connection from said means effecting relative movement between the feeler and work-piece holder to said means effecting relative movement between the master profile and projector, the magnification of said projector and relative movement between the projector and master profile being such as to keep upon the screen at any given moment the image of the part of the master profile which corresponds to the portion of the work-piece which the feeler is then engaging and to keep said image in proper relation to an index represented on the screen, so that deviations of the actual form from the desired contour can be observed as deviations of the said image from the index.

21. Apparatus as claimed in claim 1 wherein the movable mounting consists of a slide mounted to slide upon a base past the work-piece, means for moving said slide, and a table mounted to move upon the slide towards and from the work-piece, and means for moving said table, wherein the table carries the feeler, the index and a projection lens for projecting the combined image and wherein the magnification of the optical system for directing an image of the index onto the master graticule is so related to the magnification of the projection lens that the image of the index case upon the screen is substantially stationary.

CORNELIUS FRANK DIETRICH.
HARRY JOHN SMITH.

REFERENCES CITED

The following references are of record in the file of this patent:

UNITED STATES PATENTS

| Number | Name | Date |
|---|---|---|
| 1,851,173 | Hall | Mar. 29, 1932 |
| 2,035,780 | Beardsley et al. | Mar. 31, 1936 |
| 2,214,376 | Kurtz | Sept. 10, 1940 |
| 2,365,613 | Wibmer et al. | Dec. 19, 1944 |
| 2,400,942 | Milner | May 28, 1946 |
| 2,406,451 | Borkenstein | Aug. 27, 1946 |
| 2,451,155 | De Boer et al. | Oct. 12, 1948 |
| 2,476,312 | Leuty | July 19, 1949 |